US00RE36897E

United States Patent [19]

Murray et al.

[11] E Patent Number: Re. 36,897

[45] **Reissued Date of Patent: *Oct. 3, 2000**

[54] METHODS FOR CHILL TREATING NON-DISTILLED MALTED BARLEY BEVERAGES

[75] Inventors: Cameron R. Murray; William John Van der Meer, both of London, Canada

[73] Assignee: Labatt Brewing Company Limited, London, Canada

[ * ] Notice: This patent is subject to a terminal disclaimer.

[21] Appl. No.: 09/282,413

[22] Filed: Mar. 31, 1999

Related U.S. Patent Documents

Reissue of:

[64] Patent No.: 5,695,795
Issued: Dec. 9, 1997
Appl. No.: 08/229,085
Filed: Apr. 18, 1994

U.S. Applications:

[ 63] Continuation-in-part of application No. 08/035,805, Mar. 23, 1993, Pat. No. 5,304,384.

[30] Foreign Application Priority Data

Mar. 18, 1994 [WO] WIPO ..... PCT/CA/00171

[51] Int. Cl.[7] ..... C12H 1/00

[52] U.S. Cl. ..... 426/11; 426/16; 426/330.4; 426/490; 426/495

[58] Field of Search ..... 426/11, 13, 16, 426/330.4, 423, 490, 495

[56] References Cited

U.S. PATENT DOCUMENTS

| | | |
|---|---|---|
| 76,266 | 3/1868 | Storey . |
| 134,389 | 12/1872 | Mefford . |
| 173,494 | 2/1876 | Purdy . |
| 232,071 | 9/1880 | Sawyer . |
| 243,157 | 6/1881 | Ramsay . |
| 485,341 | 11/1892 | Cushing . |

(List continued on next page.)

FOREIGN PATENT DOCUMENTS

| | | |
|---|---|---|
| 224576 | 2/1959 | Australia . |
| 473382 | of 0000 | Canada . |
| 46798 | 4/1894 | Canada . |
| 59326 | 3/1898 | Canada . |
| 173898 | 3/1915 | Canada . |
| 341491 | 5/1934 | Canada . |
| 349668 | 4/1935 | Canada . |
| 372562 | 3/1938 | Canada . |
| 384056 | 9/1939 | Canada . |
| 398981 | 9/1941 | Canada . |
| 406879 | 8/1942 | Canada . |
| 424305 | 12/1944 | Canada . |
| 483017 | 5/1952 | Canada . |
| 517208 | 10/1955 | Canada . |
| 542994 | 7/1957 | Canada . |
| 543869 | 7/1957 | Canada . |

(List continued on next page.)

OTHER PUBLICATIONS

Harold M. Broderick, The Practical Brewer, master Brewers Assoc. of the Americas, Wisconsin, 1977, pp. 243–246 and 225–226.

*Primary Examiner*—Curtis Sherrer
*Attorney, Agent, or Firm*—Levy & Grandinetti

[57] ABSTRACT

A process for chill-treating, which is exemplified by a process for preparing a fermented malt beverage wherein brewing materials are mashed with water and the resulting mash is heated and wort separated therefrom. The wort is boiled cooled and fermented and the beer is subjected to a finishing stage, which includes aging, to produce the final beverage. The improvement comprises subjecting the beer to a cold stage comprising rapidly cooling the beer to a temperature of about its freezing point in such a manner that ice crystals are formed therein in only minimal amounts. The resulting cooled beer is then mixed for a short period of time with a beer slurry containing ice crystals, without any appreciable collateral increase in the amount of ice crystals in the resulting mixture. Finally, the so-treated beer is extracted from the mixture.

6 Claims, 4 Drawing Sheets

U.S. PATENT DOCUMENTS 574,111 12/1896 Pridham .
657,698 9/1900 Hasbrouck .
698,184 4/1902 Duffy .
855,449 6/1907 Dorn .
1,234,255 7/1917 Ash .
1,280,280 10/1918 Nathan .
1,724,021 8/1929 Heuser .
1,930,570 10/1933 Taylor .
1,988,954 1/1935 Nathan et al. .
2,027,100 1/1936 Hochwalt et al. .
2,027,129 1/1936 Thomas et al. .
2,032,818 3/1936 Sweek et al. .
2,036,167 3/1936 Cox .
2,040,661 5/1936 Liebmann .
2,050,908 8/1936 Willkie .
2,086,080 7/1937 Herrick .
2,091,030 8/1937 Davis .
2,108,030 2/1938 Darrah .
2,145,243 1/1939 Bagby .
2,157,633 5/1939 Schapiro .
2,181,838 11/1939 Tressler .
2,181,839 11/1939 Tressler .
2,322,749 6/1943 Silhavy .
2,354,092 7/1944 Stein .
2,510,498 6/1950 Gaeng .
2,637,652 5/1953 Ryan .
2,652,333 9/1953 Nilsson et al. .
2,657,549 11/1953 Wenzelberger .
2,688,550 9/1954 McFarlane .
2,791,333 5/1957 McKay .
2,807,547 9/1957 Nickol .
2,874,199 2/1959 Tarr .
2,879,165 3/1959 Hendel .
2,887,851 5/1959 Toulmin, Jr. .
2,916,377 12/1959 Shaler et al. .
2,939,791 6/1960 McFarlane .
3,004,395 10/1961 Morris, Jr. .
3,071,469 1/1963 Krabbe et al. .
3,128,188 4/1964 McIntire .
3,145,106 8/1964 Goerl .
3,193,395 7/1965 Tabler et al. .
3,214,371 10/1965 Tuwiner .
3,240,025 3/1966 Malick et al. .
3,251,693 5/1966 Brenner .
3,255,598 6/1966 Cottle .
3,283,522 11/1966 Ganiaris .
3,285,022 11/1966 Pike .
3,285,025 11/1966 Shaul .
3,295,988 1/1967 Molick et al. .
3,298,835 1/1967 Hildebrand et al. .
3,344,616 10/1967 Owen .
3,362,178 1/1968 Cottle et al. .
3,404,006 10/1968 Malick .
3,404,012 10/1968 Craig .
3,449,128 6/1969 Yamada et al. .
3,515,560 6/1970 Shorewood .
3,518,089 6/1970 Warkentin .
3,698,913 10/1972 Maltnim .
3,713,839 1/1973 Delente et al. .
3,729,321 4/1973 Vacano .
3,754,407 8/1973 Tyree, Jr. .
3,815,377 6/1974 Tyree, Jr. .
3,922,878 12/1975 Jalali .
3,930,042 12/1975 Dunnet .
3,940,498 2/1976 Butterworth et al. .
4,004,886 1/1977 Thijssen et al. .
4,041,180 8/1977 Wilson .
4,143,524 3/1979 Thijssen .
4,177,051 12/1979 Adams, Jr. .
4,188,797 2/1980 Thijssen et al. .
4,238,511 12/1980 Egretier .
4,249,388 2/1981 Burns .
4,265,920 5/1981 Thijssen .
4,302,476 11/1981 Lunt .
4,316,368 2/1982 Van Pelt et al. .
4,329,433 5/1982 Seebeck et al. .
4,332,140 6/1982 Thijssen et al. .
4,338,109 7/1982 Tijssen .
4,346,113 8/1982 Faust et al. .
4,351,851 9/1982 Riese .
4,406,679 9/1983 Wrobel et al. .
4,430,104 2/1984 Van Pelt et al. .
4,440,795 4/1984 Goldstein et al. .
4,459,144 7/1984 Van Pelt et al. .
4,468,407 8/1984 Vella .
4,475,355 10/1984 Thijssen et al. .
4,481,169 11/1984 Van der Malen .
4,508,553 4/1985 Thijssen et al. .
4,557,741 12/1985 Van Pelt .
4,576,824 3/1986 Gubiev et al. .
4,624,391 11/1986 Shannon .
4,652,451 3/1987 Leedham et al. .
4,666,456 5/1987 Thijssen et al. .
4,671,077 6/1987 Paradis .
4,762,622 8/1988 Thijssen .
4,787,985 11/1988 Roodenrijs et al. .
4,830,645 5/1989 Ghodsizadeh et al. .
4,840,737 6/1989 Henriquez .
4,874,615 10/1989 Gruenhoff et al. .
4,882,177 11/1989 Dziondziak .
4,885,184 12/1989 Patino et al. .
4,978,545 12/1990 Cutayar et al. .
4,995,945 2/1991 Craig .
4,999,209 3/1991 Gnekow .
5,013,447 5/1991 Lee et al. .
5,034,238 7/1991 Seidlitz et al. .
5,079,025 1/1992 Zobel et al. .
5,093,141 3/1992 Nemeth et al. .
5,102,544 4/1992 Roodenrijs .
5,112,627 5/1992 Perletti et al. .
5,137,739 8/1992 Roodenrijs .
5,160,044 11/1992 Tan .
5,173,318 12/1992 Leu et al. .
5,304,384 4/1994 Murray et al. ..... 426/330.4
5,536,512 7/1996 Murray et al. ..... 426/16

FOREIGN PATENT DOCUMENTS 578304 of 1959 Canada .
582002 of 1959 Canada .
601487 7/1960 Canada .
629704 10/1961 Canada .
672771 10/1963 Canada .
673672 11/1963 Canada .
675536 12/1963 Canada .
687780 6/1964 Canada .
693689 9/1964 Canada .
699083 12/1964 Canada .
699247 12/1964 Canada .
710662 6/1965 Canada .
732591 4/1966 Canada .
738377 6/1966 Canada .
738321 7/1966 Canada .
740166 8/1966 Canada .
776078 1/1968 Canada .
785719 5/1968 Canada .
786308 5/1968 Canada .
837539 3/1970 Canada .
868324 4/1971 Canada .
872210 6/1971 Canada .
919083 1/1973 Canada .
919578 1/1973 Canada .
937158 11/1973 Canada .

| | | |
|---|---|---|
| 949907 | 6/1974 | Canada . |
| 978876 | 12/1975 | Canada . |
| 1019619 | 10/1977 | Canada . |
| 1033284 | 6/1978 | Canada . |
| 1044506 | 12/1978 | Canada . |
| 1045443 | 1/1979 | Canada . |
| 1047436 | 1/1979 | Canada . |
| 1092884 | 1/1981 | Canada . |
| 1105827 | 7/1981 | Canada . |
| 1131140 | 9/1982 | Canada . |
| 1162473 | 2/1984 | Canada . |
| 1170103 | 7/1984 | Canada . |
| 1173382 | 8/1984 | Canada . |
| 1183076 | 2/1985 | Canada . |
| 1183483 | 3/1985 | Canada . |
| 1192833 | 3/1985 | Canada . |
| 1193960 | 9/1985 | Canada . |
| 1195130 | 10/1985 | Canada . |
| 1195918 | 10/1985 | Canada . |
| 1208416 | 7/1986 | Canada . |
| 1213168 | 10/1986 | Canada . |
| 1220728 | 4/1987 | Canada . |
| 1258438 | 8/1989 | Canada . |
| 2028298 | 4/1991 | Canada . |
| 2028548 | 4/1991 | Canada . |
| 1294907 | 1/1992 | Canada . |
| 1300535 | 5/1992 | Canada . |
| 843539 | 9/1938 | France . |
| 1020545 | 6/1950 | France . |
| 2392117 | 6/1976 | France . |
| DL-135916 | 6/1979 | Germany . |
| DL-136152 | 6/1979 | Germany . |
| DL-136506 | 7/1979 | Germany . |
| 192663 | 3/1991 | Japan . |
| 319209 | 3/1957 | Switzerland . |
| 401716 | 3/1974 | U.S.S.R. . |
| 545669 | 3/1977 | U.S.S.R. . |
| 600178 | 4/1978 | U.S.S.R. . |
| 605830 | 4/1978 | U.S.S.R. . |
| 664993 | 5/1979 | U.S.S.R. . |
| 678064 | 8/1979 | U.S.S.R. . |
| 785355 | 12/1980 | U.S.S.R. . |
| 1463746 | 3/1989 | U.S.S.R. . |
| 1567620 | 5/1990 | U.S.S.R. . |
| 9910 | of 1891 | United Kingdom . |
| 20974 | of 1895 | United Kingdom . |
| 422678 | 1/1935 | United Kingdom . |
| 428518 | 5/1935 | United Kingdom . |

METHODS FOR CHILL TREATING NON-DISTILLED MALTED BARLEY BEVERAGES

Matter enclosed in heavy brackets [ ] appears in the original patent but forms no part of this reissue specification; matter printed in italics indicates the additions made by reissue.

This application is a continuation-in-part application of U.S. application Ser. No. 08/035,805 *filed* on Mar. 23, 1993, now U.S. Pat. No. 5,304,384.

FIELD OF THE INVENTION

The present invention relates to rapid, continuous, highly uniform, chill processing of alcoholic beverages at or near their freezing points, without any substantial collateral freeze-concentration thereof; and especially in connection with the production, by way of example, of fermented alcoholic beverages such as wine, and cider, but especially of fermented malt beverages such as beer, and low-alcohol and non-alcoholic products derived therefrom.

BACKGROUND OF THE INVENTION

Many such beverages can benefit from or even require chilling in order to preserve or achieve some beneficial attribute. This is especially the case, given the extreme ability of humans to discern even trace amounts of volatile and flavour components, as well as cloudiness or "haze" that forms in some such beverages. Wine beverages for example, can benefit, and specifically so in cases which require remedial processing to deal with, say, excess tartrate concentrations.

Brewery beverages, or fermented malt brewery beverages in particular, are of particular interest because of the special benefits to be accrued by way of "chilling". The general process of preparing fermented malt beverages, such as beer, ale, porter, malt liquor, low and non-alcoholic derivatives thereof, and other similar fermented alcoholic brewery beverages, hereinafter referred to simply as "beer" for convenience, is well known. As practiced in modern breweries, the process comprises, briefly, preparing a "mash" of malt, usually with cereal adjuncts, and heating the mash to solubilize the proteins and convert the starch into sugar and dextrins. The insoluble grains are filtered off and washed with hot water which is combined with the soluble material and the resulting wort boiled in a brew kettle to inactivate enzymes, sterilize the wort, extract desired hop components from added hops, and coagulate certain protein-like substances. The wort is then strained to remove spent hops and coagulate, cooled and pitched with yeast, and then fermented. The fermented brew known as "green" or "ruh" beer is then "finished", aged—which is sometimes referred to as "lagering"—and clarified, filtered, and then carbonated[)] to produce the desired beer.

A variation on the basic process which is now well recognized is termed "high gravity brewing" in which procedure the green beer is produced at an elevated alcohol content (say for example from 7 to 8% v/v, and this is then diluted to the alcohol content desired in the finished beer ([eg.] *e.g.,* 5% v/v for a "regular beer").

As is well known, beers in general develop a haze over time and/or through changes in temperature of the beer. This haze is considered to be made up of two types:

(a) "chill haze" which is temperature sensitive and may disappear as the temperature of the beer is raised to, say, room temperature; and (b) "permanent haze" which, as the name implies, once created, remains.

Of course, if a beer is consumed warm, as is customary in some European countries, then chill haze may not be as serious a problem for the brewer and consumer as it otherwise would be for beers that are customarily consumed cold, (as is typically the case for North American beers, for example).

In any event, the problem of chill haze manifestation has been exacerbated by industry trends that have resulted in an increase in the amount of time that normally elapses between when the beer is finished, and when it is finally consumed by the public. As a consequence the haze has a greater opportunity to develop to a problematic and often unacceptable degree.

The exact nature and mode of formation of haze in beer is still uncertain but it is generally accepted that haze comprises significant amounts of proteins, yeast cells, metals, cell components, polyphenols and various other materials.

The problem of haze formation has been addressed in many ways over many years. The traditional way, of course, is to subject the beverage to a conventional "lagering" step over the course of which the beverage is stored at near zero temperatures for periods of time ranging from weeks to, in extreme cases, up to several months. During this step of the process the yeast cells, proteins, etc., settle out and, all things going well, the taste of the beer may also improve; the beer is said to "mature".

Conventional lagering, however, is not proving to be adequately proactive in keeping pace with the increasing chill-haze problem that results from the longer post-finishing pre-consumption time period mentioned above. Moreover, the time, capital and operating cost commitments associated with the lagering process, account for a significant proportion of the overall brewery costs. Accordingly, significant effort continues to be expended in the search for ways to deal with the chill haze problem, and to find better and less time-consuming alternatives to lagering in general.

Examples of the results of such efforts include the use of polyvinylpyrrolidone (PVP) to stabilize beer by combining with the [polyphenyls] *polyphenols*, which use [this] is well documented, refer to U.S. Pat. Nos. 2,688,550; 2,939,791 and others.

U.S. Pat. No. 3,251,693 teaches adding various silicates particularly calcium, magnesium or zinc silicates to the beer (or wort) and U.S. Pat. No. 3,940,498 teaches the use of certain acid treated synthetic magnesium silicates. For example U.S. Pat. No. 3,940,498 teaches adding an acid-treated synthetic magnesium silicate to the beer.

Although these methods do alleviate aspects of the chill haze problem, they by no means eliminate it or replace the lagering process. Moreover these solutions are becoming less favored in the industry, as the use of additives or processing aids in foods becomes less popular with consumers.

Improvements in beverage stability have been mentioned as ancillary benefits in the extensively explored freeze concentration processes. For example, Canadian Patent No. 673,672 involves freezing beer to produce a slurry of concentrated beer, ice and other solids including yeast cells, removing the ice and other solids from the desired concentrated beer, which has concentrated up to five-fold relative to the starting beer. The ice is discarded or passed into a system to recover beer or desirable components entrained thereof on the ice. All freeze concentration processes suffer from the fact that the ice removed can carry away some of the desired material and recovery of that material which is occluded or retained on the ice, by washing extraction or other means, brings its own problems—refer for example to Canadian Patent No. 710,662. Also, the practical process is usually multistage with successive stages being effected at temperatures reduced relative to earlier stages, this procedure being quite common in the freeze concentration art—refer for example to Canadian Patents No. 601,487 and No. 786,308. This latter patent has the same inventor and proprietor as Canadian Patent No. 673,672 and covers products produced by the latter patent. Despite the quite amazing claims made for the products produced under this patent, it does not seem to have ever been commercially exploited. U.S. Pat. No. 4,885,184 teaches a process for preparing flavored malt liquors wherein an aged fermented wort is freeze concentrated generally to the 20% to 30% alcohol by volume level, and various flavorings are then added.

Quite apart from the claims that have been made for accelerated aging and improvements in beverage stability in the freeze concentrated products, there are significant and in some cases insurmountable problems that arise out of collateral concentration of the beer. First of all it is illegal in many jurisdictions to concentrate by distillation or otherwise any alcohol-containing substrate without a distillers or other appropriate license. There is also a fundamental question over whether the product of such a distillation can legitimately be labeled as "beer" at all. Moreover, the stability of freeze concentrated beers appears to be very much in doubt or at least suspect, notwithstanding the various claims that may have been made to the contrary. While any number of attempts have been made to produce concentrated beer products, many have been faced with product instability, as exemplified by work done at the Institute of Brewing Research Laboratories (Essery, Cane and Morris, Journal of the Institute of Brewing, 1947, Volume 53, No. 4; Essery and Cane, ibid., 1952, Vol.58, No.2, 129–133; and Essery, American Brewer, 1952, Volume 85, No. 7, 27, 28, and 56). As described in the cited articles, when the concentrated beer was stored and then diluted back to its original concentration, the reconstituted product tasted decidedly weak and under-hopped, so that freeze concentration seemed to cause considerable loss of palate-fullness and loss of bitterness. The cited articles also indicate that storage of the concentrate also often actually led to the production of haze and a vinous flavour in the beer.

In the freeze concentration process described in Canadian Patent No. 872,210, the unfermented wort [which] is freeze concentrated, this apparently providing efficiencies in obtaining a higher yield or extract from the brew materials than is obtained in a regular brew. Because the process is not carried out on an alcoholic substrate, distillation is not an issue. With regard to chill haze, however, any predisposition of a beer to elicit chill haze which is engendered as a result of the fermentation process, will not be addressed by the pre-fermentation freeze concentration process called for in this Canadian patent.

Another proposal that avoids the problems of distilling an alcoholic beverage, is set out in Australian Patent Specification 224,576. This patent suggests batch freezing a beer to create a slush ice condition. This condition is maintained for up to seventy-two hours and is followed by melting the beer and immediately separating out any precipitated materials. However it is appreciated that the beer contains material which redissolves before it can be removed in the normal course by filtration or centrifugation and consequently the pre-freezing addition of a general adsorbent material such as asbestos or bentonite appears from the teachings of the patent to be critical to the process, so that the precipitated material—eg chill haze material—is adsorbed onto the insoluble additive, before it can redissolve upon melting of the slush. This approach, however, falls back into the problems associated with the use of processing aids and additives as mentioned above, and in particular runs headlong into the prohibition against any food-related use of asbestos in particular. Also, the need to maintain a frozen mass of beer for any protracted period of time appears to be faced with many of the same shortcomings that attend conventional lagering. Moreover, and notwithstanding the collocation of the ice and the beer throughout this process, the fact remains that the aqueous component of the beer is frozen and the balance of the beer is held in a concentrated state. However temporary that condition may be, the fact is that this process necessarily entails concentrating the beer, and is in this connection, merely a batch processing version that is otherwise similar to the continuous process that is described in U.S. Pat. No. 3,295,988 —Malick. In both the Australian patented process and the Malick process, the beer is concentrated for a period of time, and then the large amount of frozen aqueous component is melted into the concentrated beer to form the reconstituted beer product from concentrate.

Malick—the developer of the so-called Phillips freeze concentration process, was preeminent in attempts to commercialize freeze concentration technology in beer related applications. According to Malick, (in the article "Quality Variation In Beer, Apr., 1965), accelerated lagering is caused "because it takes place in a concentrated state". That being the case, the prior art teaches that actual concentration of the beer is a prerequisite to achieving accelerated lagering (with any claimed attendant physical stability benefits).

As indicated above, the occurrence of haze in beer and the management of the lagering process are, obviously, still significant practical problems for the brewing industry, despite the extensive efforts and diversification of the preferred solutions from the past.

Moreover, and notwithstanding Malick's above-quoted assertion that actual concentration is a prerequisite, the present invention has surprisingly revealed that in fact there is no substantive requirement for concentration to take place, and that benefits previously thought to be associated with concentration can be achieved substantially in the absence of such concentration. Moreover, in the case specific of beer, additional advantages with respect to hop flavour retention are realize in applications of the present invention that are not in evidence in the prior art freeze concentration processes.

As indicated, the above detailed discussion centers around alcoholic brewery products and the problems specific to fermented malt beverages. However, there is a need in the alcoholic beverage industry to provide rapid, uniform cooling of alcoholic beverages, usually during processing, to their freezing points, without running the risk of actually freezing to liquid to the point where it cannot be readily handled (ie pumped).

SUMMARY OF THE INVENTION

Accordingly, there is provided a process for chill-treating an alcoholic beverage. This process comprises subjecting the beverage to a cold stage comprising rapidly cooling the liquid to a temperature of about its freezing point in order to form, mostly only nascent, ice crystals, and then only in minimal [Mounts] *amounts* thereof. The resulting cooled beverage is then mixed for a short period of time with an aqueous slurry. This is effected without any appreciable increase in total ice crystal mass contained in the resulting mixture during said mixing, (ie concentration of the liquid under treatment is avoided). Finally, the so treated beverage is extracted from the mixture. The process as a whole can be carried out without any substantial collateral concentration of the beverage. Preferably, the said resulting cooled beverage is mixed with a residual volume of ice crystals in said aqueous slurry.

The process of the present invention as set forth in the preceding paragraph differs markedly from the various processes [with] *that* utilize freeze concentration processes, even if relatively temporarily in some instances. In freeze concentration processes, the "cold-stage" processing step is carried out specifically for the purpose of minimizing the production of small "subcritical" crystals in the aqueous liquid. When admixed as a suspension with larger, "supercritical" ice crystals, the mean bulk temperature of the liquid equilibrates to an intermediate value in the range of the respective melting points of the various ice crystals in the resulting suspension. Since the mean average temperature is higher than the melting temperature of the smaller "sucritical" crystals, most melt. The thermodynamic energy redistribution results in collateral crystalline growth of the larger, "supercritical" ice crystals and these have to be continuously removed, as more of the same continue to grow. This thermodynamic behavior drives the overall increase in the ice mass, and stands at the very heart of most commercial freeze concentration processes. (Note: "supercritical" and "subcritical" crystals, in the present context, are art-recognized terms—see CRC Critical Reviews, in Food Science and Nutrition, Volume 20, Issue 3, page 199.)

By way of contrast, to the above described freeze concentration processes, the present invention, broadly speaking, is distinguished in that such subcritical ice crystal growth as there may be in a near-freezing flow of beverage, is thermodynamically balanced against supercritical ice crystal melting in the flow-through reactor (eg a "recrystalizer"), such that there is (on average) no appreciable interim increase in the concentration of the aqueous flow stream as it traverses the treatment zone, (i.e., although from time to time the amount of ice in the recrystalizer vessel—mentioned elsewhere herein—may be adjusted by controlling the amount of refrigeration that the incoming liquid is subjected to, the overall effect avoids collateral concentration). This helps to avoid problems in the art that are associated with beverage properties following concentration and reconstitution to the desired beverage—refer in particular, to the detailed disclosure herein as it relates to beer. Accordingly, the concentration of the beverage as processed in accordance with the present invention undergoes at most only very nominal, and in general only extremely transient increases. This is the very antithesis of freeze concentration processing, where the very objective of processing is entirely the reverse.

In a preferred form, the process of the present invention is adapted for chill-treating a volume of an alcoholic beverage, in which the liquid medium of the post cold-stage resident volume of stable-ice-crystal-in-aqueous-liquid slurry comprises the same alcoholic beverage and the treated liquid solution is drawn off in a volume equal to the original volume.

In a continuously operated embodiment, the present process facilitates continuously chill-treating by subjecting a volumetric flow of pre-treatment beverage to the cold and post-cold-stages mentioned above, and drawing-off treated potable aqueous liquid solution in a equal volumetric flow.

In particularly preferred applications of the present process, the resident volume of stable ice crystals in the same beverage are about 10 to about 100 times larger than the nascent ice crystals contained in the incoming cooled beverage.

The [treat] *treatment* process according to the present invention can be carried out at any post-fermentation stage of the brewing process at large, and while preferably done prior to or in place of any significant aging steps, it is also entirely possible to conduct the present chill treating process following some intermediate ageing step.

The process is generally applicable in respect of malt beverages, and too, relates more generally to the preparation of fermented cereal beverages (and especially distilled beverages). In that latter case, the process includes the steps of fermenting a cereal-containing substrate to produce an ethanol-containing liquid; distilling or otherwise concentration the ethanol-containing liquid to produce a distillate having a predetermined ethanol concentration; and, subjecting the said ethanol-containing liquid or the resulting beverage to the aforementioned chill-treatment. Examples of fermented cereal beverage production include the group consisting of: all malt; mixtures of rye and malt; mixtures of corn, rye and malt; mixtures of rye, wheat and malt; corn; and, rice. These are employed in known manner in the production of the corresponding beverages: scotch; rye; bourbon; Irish whiskey; grain alcohol; and, Arak, respectively.

Additionally, the present process can be employed in the treatment of comestible aqueous liquids, and in particular a potable aqueous liquid, and especially beverages, which are generally azeotropic mixtures. Typically, such a liquid will, in every substantive respect, be a binary azeotropic aqueous mixture containing alcohol, and in general, the alcohol will be ethanol.

Similarly, the process of the present invention extends to the preparation of fermented wine beverages comprising crushing grapes; separating the [pommace] *pomace* and must; fermenting the must to produce a wine; and racking-off precipitated [tanins] *tannins*, proteins, pectins and tartrates. In accordance with the present process, either or both the must or the resulting wine is subjected to the above described chill-treatment. Fruit wines, produced by similar known methods may be similarly treated according to the present invention.

In like manner, the present invention extends to the production of a fermented rice wine beverage produced by generally known procedures, and usually comprising saccharifying polished rice with amylolytic enzymes to prepare an aqueous mash; acidifying the mash containing fermentable sugars produced through the action of said enzymes on the rice; fermenting the fermentable sugars contained in the acidified mash with an acid-tolerant yeast to produce rice wine; and, finally subjecting the resulting rice wine (sake) to the chill-treatment as specified herein.

Moreover, alcoholic cider produced by the usual and well known methods may also be further processed according to the present invention.

However, the especially preferred form of the present invention relates to a process for preparing malt brewery beverages, and in particular, fermented malt brewery beverages. In accordance with this aspect of the invention, there is provided a process comprising mashing brewing materials with water; heating the resulting mash and separating wort therefrom; boiling, cooling and fermenting the wort; and, subjecting the resulting beer to the chill-treatment as specified herein. Prior to chill-treating, it is particularly advantageous that the yeast cells be generally substantially removed from the fermented wort since an excess residual of cells may be ruptured during the treatment and the breakdown products produce off-flavors and possibly contribute to physical instability of the product. Following such removal, it is preferred that less than about half a million yeast cells per ml remain in the fermented wort. In one embodiment, the fermented wort [be] *is* degassed (in known manner) prior to chilling in accordance with the present invention.

As is generally well known, the alcohol content and solids content of any given beer will [effect] *affect* the freezing point. It is, however, contemplated that for most commercial purposes, the application of the present invention will generally involve cooling the brewed green beer to in the range of −1° C. to −5° C. For beers that are produced in accordance with otherwise conventional, contemporary North American brewing practices, the brewed green beer will typically be cooled to in the range of −2° C. to −4° C., preferably −3° C. to −4° C.

Rapid cooling helps to ensure that only nascent ice crystals develop—these being relatively small and unstable. Preferably, cooling is effected in generally less than 60 seconds, preferably in about 30 seconds or less, and especially in about 5 seconds or less.

Typically, this will generate a minor amount of nascent ice crystals during the cooling, for example, generally in an amount of less than 5% by volume of said brewed green beer. More typically, the nascent ice crystals are formed in an amount of about 2% or less by volume. The nascent crystals are generally smaller than about 10 microns in size.

Once the brewed green beer is so cooled, it is then passed immediately to the ice crystal-containing treatment zone. This zone is completely filled with a slush-like slurry comprising ice crystals and the green beer. Here, the green beer undergoes post-cold-stage mixing treatment with a resident volume of generally stable ice crystals in aqueous liquid slurry. The slurry liquid medium preferably comprises the same green beer. Also stable ice crystals are preferably of about 10 to about 100 times larger than the nascent ice crystals, ie such stable crystals are about 100 to 3000 microns in size. The mixture is maintained in a constant state of agitation to maintain it homogenous.

The proportion of the stable ice crystals in the slurry in the post-cold-stage resident volume is maintained in an amount of less than 45% by volume. Care should be taken when using larger proportions, since these can create mechanical mixing problems, and can interfere with homogeneity of treatment (eg creation of flow channeling, etc). Control over the amount of stable ice crystals is effected by way of a feedback signal that is generated in response to signals from ice sensors arranged in ice-crystal-concentration sensing relation to the post-cold-stage resident volume of stable-ice-crystal-in-aqueous-green beer slurry. A preferred conductivity-based sensing device is described elsewhere herein, in greater detail. Other such sensing devices will be readily apparent to persons skilled in the art, in light of the present disclosure. In any case, the feedback signal controls the degree of the preceding, cold-stage cooling of the green beer, to reduce or increase as required, the amount of nascent ice crystals that are formed therein, to thereby adjust the proportion of stable ice crystals in said post-cold-stage resident volume to the desired volume. Typically, the proportion of stable ice crystals in said post-cold-stage resident volume is maintained in an amount of less than 35% by volume, generally in an amount of less than 25% by volume, preferably in an amount of about 5 to 20% and especially in an amount of about 10 to 20% by volume. However, the amount may be less than 5% provided it is sufficient to maintain the treatment zone at about the liquid freezing point. This results from the fact that the stable ice crystals function as a well dispersed, high surface area, heat buffer, that serves to maintain the surrounding liquid at about its freezing point. The temperature to which the green beer is pre-cooled, and the residence time of the beer in the treatment zone are inter-related to the minimum optimal proportion of stable ice crystals.

Typically, the residence time of the green beer in the post-cold-stage slurry is less than one hour. Preferably, the residence time of the green beer in the post-cold-stage slurry is generally up to 15 minutes, and usually about 5 to 15 minutes, but may be less, to as low, for example, as say 1 to 2 minutes.

Following post-cold-stage slurry treatment, the chill treated, green beer is preferably subjected to inert gas purging in a holding (aging) tank to remove residual volatiles such as sulphur compounds like mercaptans and thiols. The "inert" gas (meaning a gas which does not adversely effect the beer), may be carbon dioxide, or nitrogen. Note that nitrogen in particular, has low solubility and has no deleterious effect on the liquid, whereas in extreme concentrations, carbon dioxide is less desirable and potentially deleterious. This purging process compliments the accelerated "physical aging" (that is facilitated by chill-treating), by accelerating an aspect of what might be called "flavour aging". The combination of these processing steps is especially advantageous in reducing the time required for aging, (and might even be employed to replace conventional aging altogether).

The need for aging is well recognized in the art, and especially in connection with production of higher strength beers (eg 15 degrees Plato). According to EP Publication No. 180,442, for example, it is disclosed that:

> "The problems of producing higher strength beers do not stop with fermentation. Long maturation times are required for the removal of "off" flavors and for the development of acceptable flavors and aromas. Furthermore, long periods of cold storage are required to stablize the beer . . . ".

In accordance with one aspect of the processing associated with the present invention, beer maturation is accelerated by forcing high levels of carbon dioxide (eg 2.8 to 3.0 volumes) into the chill-treated beer, on its way from the treatment zone to the ageing or storage tank. The beer is then held in the ageing tank, and vented over a period of about 24 hours. The aging tank is then sealed, and monitored to ensure that internal tank pressure does not build up. If the pressure within the tank does rise materially following sealing, then the beer is again vented for a further 24 hours. This sealing/venting cycle is repeated as often as necessary, until tank pressure no longer builds up.

In accordance with another aspect, a "zero" aging process is provided in which chill-treated beer, while still at near-zero temperatures mentioned earlier, is passed to a reactor ("a scrubber") and purged with an inert gas, such as nitrogen gas, then passed straight-away, for packaging, without undergoing significant interim ageing.

Both of the forgoing "accelerated aging" aspects of the present invention provide the so-called "flavour ageing" mentioned above. Note, however, that the related improvement in flavour maturation is separate and apart from the qualitative improvement in hop flavors that have been associated with the chill-treating process, per se.

The present invention is especially useful in conjunction with high gravity brewing processes. In one regard, the treatment of high gravity green beer in the chill treatment according to the present invention, improves the reduction in chill-haze and other precipitable materials as mentioned above. Also typical breweries have a limited storage capacity in which to hold beer during aging thereof, and this problem can be made even more acute when using high gravity brewing procedures if the diluted finished beer must be stored somewhere prior to bottling. Since the present invention, by accelerating aging, frees up aging tank time, that space is available to hold beer prior to bottling. Accordingly, carrying out high gravity dilution only after the chill treatment according to the present invention is completed, provides a dove-tailing of the high gravity and chill treating processes.

However, if aging tankerage is not a problem, then the chill-treating process of the present invention may be effected for advantage, subsequent to, say, a reduced period of ageing in the tanks.

When high gravity brewing is coupled with the process of the present invention, it is also possible, if desired, to carry out the dilution process during the chill-treatment, by directing a preferably cold-stage treated, diluent stream, preferably cooled to a similar temperature (subject always of course to to its own colligative properties) such that the thermodynamic balance referred to earlier herein, may be readily maintained, in mixing relation into the high gravity green beer stream. This may be useful in particular when the diluent is a lower alcohol green beer, as might be the case when the target alcohol concentration in the finished beer is intermediate between the respective concentrations in the two green beer streams. If the diluting stream is not prior cooled, then the temperature of the liquid must be adjusted accordingly, so that the overall thermodynamic balance of the present process is preserved.

The chill treatment according to the present invention is also especially advantageous in the production of non-alcohol and low-alcohol products. The former contains substantially no alcohol, about 0.01% to 0.05% v/v, whereas low alcohol products have about 0.5% to about 1% v/v of alcohol. They are generally produced in one of two ways:

a) traditionally, by removing the alcohol from a regularly brewed beer by distillation and more recently by ultrafiltration; or, b) by "cold contact" processing where only minimal fermentation is permitted, such that the alcohol content is at most about 1% v/v and which can be reduced by further dilution to the desired value, usually about 0.5% v/v (volume/volume). (Such a process is described in a variety of patents/applications—Japanese Kokai 53-127861, for example, discloses such a process, as do U.S. Pat. Nos. 4,661,355 and 4,746,518, and published Canadian Patent Application 2,027,651. A significantly improved cold-contact process is disclosed in U.S. application Ser. No. 07/967,275 filed Oct. 27, 1992, which is a continuation-in-part of the also commonly assigned, and now abandoned U.S. patent application Ser. No. 07/783,332, filed Oct. 28, 1991 (incorporated herein by reference).

These products have the same haze forming components as regular beers and this is especially so in the cold contact products. Hence they may be advantageously processed according to the present invention.

As indicated above it is believed that a reduction, inter alia, in polyphenol content of the beer contributes to the reduction in the period [reburied] *required* for [ageing] *aging*. To illustrate this point, the following evaluation was made:

The present invention was used to produce seven green beer [substrate] *substrates*. Evaluations were conducted according to known ASBC industry standards, to determine the polyphenol content of the substrate green beer prior, and subsequent, to the treatment according to the present invention. The results were as follows:

| Brew | Pre-Treatment | Post Treatment |
|---|---|---|
| 1 | 144 | 130 |
| 2 | 152 | 148 |
| 3 | 184 | 165 |
| 4 | 195 | 144 |
| 5 | 192 | 144 |
| 6 | 182 | 153 |

As discussed above, it is considered that a major factor in haze production is the slow precipitation of [polyphenyls] *polyphenols* over time and hence, the reduction thereof by the process of the present invention demonstrates the increased stability of the so treated products as compared with regular beer against chill haze of the products treated according to the present invention. Moreover, the beer exhibited desirable flavor characteristics, especially smoothness. It should be noted that differences in the polyphenol contents are significant.

In accordance with yet another aspect of the present invention, there is provided a liquid flow-through apparatus for continuously chill-treating an alcoholic beverage. The apparatus comprises a heat exchanger for cooling the aqueous solution to reduce the temperature thereof to about its freezing point with only minimal amounts of nascent ice crystals being formed therein, in combination with a container or vessel for containing ice, which vessel is interconnected in downstream serial relation to the heat exchanger, for receiving cooled aqueous solution therefrom. This vessel includes separator means for passing chill-treated liquid from the ice container, while retaining stable ice crystals inside of the vessel. The apparatus further includes retained ice-crystal-concentration monitoring and controlling means for monitoring and responsively thermally[.] controlling the amount of ice crystals that are contained in the vessel.

In operation, the heat exchanger rapidly cools the aqueous solution to a temperature of about its freezing point in such a manner that any nascent ice crystals are formed therein only in minimal amounts. The resulting cooled aqueous solution is then mixed in the ice container, for a short period of time, with a post-cold-stage resident stable volume of ice crystal containing aqueous slurry. During this mixing the heat balance is feed-back controlled in part by the above mentioned monitoring and controlling means such that there is no appreciable increase on average, in the total ice crystal mass contained in the resulting mixture, and the temperature of the aqueous slurry is maintained (buffered) at near freezing by the ice mass. Thereafter the treated beverage is extracted from the mixture through the separator means.

In operation, the retained, stable ice crystal-concentration monitoring and controlling means monitors the concentration of the stable ice crystals in the ice vessel and responsive to the monitored condition thereof, thermally regulates the amount of stable ice crystals contained in said container during the passage of aqueous solution therethrough.

The liquid is forced through the system under sufficient positive pressure to facilitate the requisite flow rate through the apparatus. Typically, the apparatus includes temperature and flow rate control means associated with the heat exchanger to thereby effect the cooling of the aqueous solution therein. In a preferred form, this is accomplished in less than about 60 seconds, even in 30 seconds or less, and even in about 5 seconds.

The separator means is delayed from separating for a period of time that preferably does not exceed 60 minutes, (preferably for less than 30 minutes, and especially for from 5 to 20 minutes).

In one form, the apparatus includes degassing apparatus, serially interconnected upstream of the heat exchanger, for degassing the aqueous liquid prior to cooling thereof.

In an especially preferred form, e.g., for treating brewed green beer, the heat exchanger is a scraped surface heat exchanger adapted to cool the beer to near its freezing point, which generally will be in the range of −1° C. to −5° C. and especially to in the range of −2° C. to −4° C. with the specific temperature in each case depending, inter alia, on the alcohol and solids content of the beer.

In operation the cooled green beer is then serially passed into the ice vessel, which adapted to be completely filled with a slurry comprising the stable ice crystals and the, for example, green beer, which slurry is maintained in a constant state of agitation by agitation or stirring means (e.g., more generally dispersing means) means operable in any case for rendering the distribution of the slurry in the vessel, homogenous. This agitated condition preferably operates like a fluidized bed with the ice crystals held uniformly suspended in the moving liquid.

The control means preferably maintains ice container resident stable ice crystals of about 100 to 3,000 microns in size. These are larger by a factor of from 10 and 100 times, than typical nascent crystals that are contained in the green beer as it exits from the heat exchanger.

The apparatus hereof preferably has an ice vessel which includes an insulated housing.

Also, the feedback mechanism operates in response to signals from ice sensors in or adjacent the treatment zone (e.g., vessel), to effect a reduction or increase in the amount of ice contained therein, by ensuring the green beer is further cooled or is less cooled, respectively, in the heat exchanger. This is a dynamic, and ongoing adjustment, throughout the process. The proportion of stable ice crystals is preferably a fixed amount, with a set-point that is usually established such that about 10% to 20% of the volume of the vessel is maintained as stable crystals.

Flow rate control means is employed to regulate residence time of the green beer in the ice treatment zone, and this is preferably of relatively short duration, e.g., less than one hour, generally up to 15 minutes, usually 5 to 15 minutes and may be as low as 5 to 2 minutes or less.

In the exemplary embodiment, the present invention provides a process for continuously processing beer at low temperatures in the apparatus generally as set forth above. In that connection it has been found that if, in the brewing process, and preferably prior to aging the temperature of beer is rapidly reduced to approximately its freezing point in a manner such that only a minimal amount of crystals are formed, and the so cooled beer is contacted with an agitated slurry of ice crystals for a relatively short period of time and without concentration of the beer, the aging stage of the brewing process can be significantly reduced, and, perhaps, even eliminated. The process of the present invention ensures that all the beer being treated is invariably subjected to the same low temperature treatment and hence is uniformly processed and with less risk of the equipment freezing up and being damaged.

Moreover, the resulting finished beer is smoother, less harsh, and more mellow compared to regularly processed beer, especially if care is taken to remove substantially all of the yeast cells emanating from the fermentation from the green beer prior to [it] *its* being treated. Moreover, the present invention has been found to be useful in reducing metallic hop notes but without reducing the bitterness characters—an advantage which is especially desirable in high "bitterness units to extract beers", and to highly bittered brews in general. While bitterness is a characteristic which in greater and lesser degrees, is desirable and even specific to malt brewery beverages, it can manifest as a metallic note in beers where organoleptically large proportions of hops or hop extracts are used in the brewing process. This can be a problem in so-called "no-alcohol and low-alcohol" beers, and low extract beers. It can also be a problem in beers where very large amounts of bitterness units are part of the product profile. For example, some beers have bitterness units specifications that run from 20 BU to as high as 60 BU or more. This reduction in the metallic taste can be used to advantage in rounding out the desirable bitter flavour of the beer, without loss of the essential hop character.

Accordingly, there is provided in another aspect of the present invention, a beer product produced in accordance with the process of the present invention. More particularly, there is provided an alcoholic beverage, and more specifically a chill-tempered beer having a thermal history in accordance with which the beverage was rapidly cooled to a temperature at about its freezing point whereby only sufficient heat to form minimal amounts of nascent ice crystals therein was extracted, and whereafter, the resulting cooled beverage was mixed with a volume of ice-crystals in an aqueous slurry, and the mixture was held for a short period of time, during which at least a portion of said nascent ice crystals melted but without any appreciable collateral increase in the total ice crystal mass contained in the resulting mixture; and, whereafter the resulting chill-tempered beverage was separated from said mixture, at a total dissolved solids and alcohol concentration that was not substantially greater than the total dissolved solids concentration of the original, untreated beverage.

Generally, therefore, there is provided a chill-tempered beverage extract from an admixture of a slurry comprising: stable ice crystals suspended in aqueous liquid; and, an un-tempered beverage having had a minor aqueous proportion thereof passed through an initial liquid-to-solid state change in the formation of nascent ice crystals and then through a reverse solid-to-liquid state change on melting thereof in the admixture without any appreciable collateral increase in the total ice crystal mass contained in the admixture.

DETAILED DESCRIPTION OF A PREFERRED EMBODIMENT

[Introduction to the Drawings The process of the present]

*Introduction to the Drawings*

*The process of the present* invention will be more fully described but not limited by reference to the following drawings in which.

Figure 1:
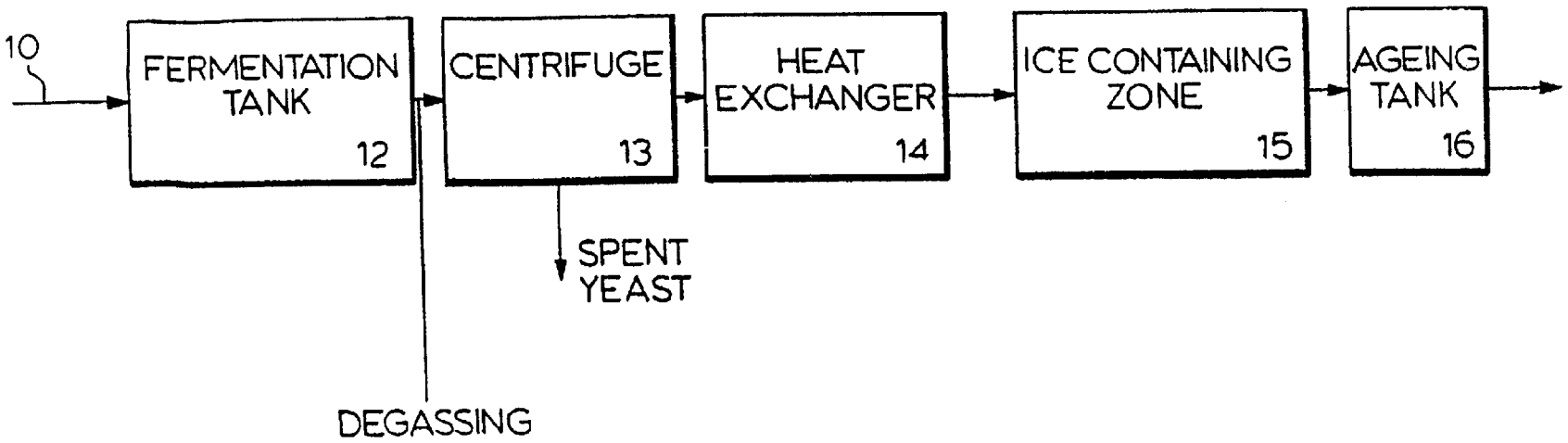
FIG. 1 is a schematic drawing showing the steps involved in the treatment of the green beer according to the present invention.

According to a preferred aspect of the present invention there is provided a process for preparing a fermented malt beverage wherein brewing materials are mashed with water, the resulting mash is heated and wort separated therefrom, said wort is boiled cooled and fermented and the green beer is subjected to a finishing stage, which includes aging, to produce said beverage, comprising additionally subjecting the beer to a cold stage comprising rapidly cooling said beer to a temperature of about its freezing point in such a manner that ice crystals are formed therein only in minimal amounts, mixing said cooled beer for a short period of time with a beer slurry containing ice crystals without any appreciable increase in the amount of ice crystals in the resulting mixture, and extracting so treated beer from said mixture. It may be noted that the extracted beer is generally free of ice crystals, these having for the most part melted back into the liquid or retained in the slurry.

In accordance with one aspect of the preferred embodiment of the invention the substrate beer is green beer and the said treatment is effected prior to aging thereof.

In a further embodiment therefore, the present invention provides a process for preparing a fermented malt beverage wherein brewing materials are mashed with water, the resulting mash is heated and wort separated therefrom, said wort is boiled cooled and fermented and the green beer is subjected to a finishing stage, which includes aging, to produce said beverage, comprising prior to aging, subjecting the beer to a cold stage comprising rapidly cooling said beer to a temperature of about its freezing point in such a manner that, at most, only ice crystals of a small size, and in minimal amounts, are produced therein, treating said so cooled beer for a short period of time in a fluidized bed of ice crystals having a size greater than that of said small crystals, such that there is no appreciable rise in the amount of ice, and recovering the so-treated green beer.

In carrying out the process of the present invention the cooling stage is conveniently carried out in a scraped surface heat exchanger and the mixing stage, which may comprise mixing the cooled green beer with an agitated slurry of ice crystals in green beer, may be conveniently effected in what is often termed in the literature as a "crystallizer" unit which forms part of commercially available freeze concentration systems. Such a system and associated apparatus are described for example in U.S. Pat. No. 4,004,886 to Thijssen et al, the disclosure of which is hereby incorporated by reference. As will be readily appreciated, only a portion of the device described in U.S. Pat. No. 4,004,886 is used in carrying out the process of the present invention and that is operated in a very different manner to that taught in that reference. Essentially, it is used to provide a treatment zone containing an amount of an agitated slurry of preferably larger ice crystals which [maybe] *may be* considered to function as a fluidized bed in which the beer is treated as it passes therethrough, the amount of crystals in the "bed" does not appreciably [increasing] *increase* throughout the process. The treated beer is separated from the ice crystals which remain in the treatment zone, until, periodically, following from at the end of each brewing cycle during which generally from 1,200 to 15,000 hectoliters or beer are treated, the ice crystals are removed and discarded. Again, it may be noted that the majority of the crystals entering the recrystalizer are relatively small and, as explained above, are removed by melting.

Initially, the process can be initiated by adding the, preferably relatively larger crystals (usually having an average size from 100 to 3,000 microns) in "bulk" to the treatment zone or, conveniently, they can be generated in situ by introducing the cooled beer into the zone and, over a period of time, under conditions in which the preferably relatively smaller ice crystals, which comprise only about 5%, and usually about 2% of the beer volume, will grow and produce the desired amount of larger crystals in the zone. Thus relatively short start-up phase for generation of the stable ice crystal containing slurry is preferred but is not critical to the present invention.

It has been found that [when] the treatment zone operates in an efficient steady manner when it contains about 20% to 25% and preferably 10 to 20% by volume of said crystals although amounts of from 35% to 5% or even less by volume of said crystals may be used depending on, for example, the type of beer being treated. The specific amount may vary slightly during processing but any such variances are monitored and a feedback system is arranged to instruct the heat exchanger or equivalent cooling system to increase or decrease, as required, the temperature of the cooled green beer to re-balance the system. Such systems, e.g. based on determination of the ice content by electric conductivity, are readily available.

It has been found that the above system functions in an efficient manner if the green beer, usually exiting the fermenter at say 10° C. to 17° C. is cooled to between about −1° C. to −5° C. and is then passed through the scraped surface heat exchanger or other suitable cooling device where it is cooled to as low as about −5° C., usually −4.5° C. to −1° C. That same temperature is generally maintained in the treatment zone.

The actual freezing temperature of the beer substrate and hence the temperature attained in the cooling zone depends on a number of factors including the beer composition, Plato value, but especially the alcohol value. For example, with a green beer having a Plato value of about 16° P as is routinely the case in high gravity brewing, and an alcoholic content of about 7% to 7.5% alcohol by volume, the green beer is advantageously cooled to a temperature of about −4° C. before being introduced into the treatment zone. The higher the alcohol content, the lower the temperature which will generally be required to achieve the product having the desired characteristics.

It should be noted that the two components of this specific system, the heat exchanger and the treatment vessel, except at start-up) operate full of liquid medium and hence there is no need to provided an inert atmosphere which would otherwise have been required.

A major advantage of the present invention is its capability to be carried out in a continuous manner without the ice-containing treatment zone becoming inoperative because of buildup of ice coats *in the* cooling tubes and similar items in cooling systems making them less efficient, and renders control of the system very difficult and in the extreme case clogs the system, a problem with the various prior art processes.

In the following, a preferred treatment of green beer prior to aging is described, although it is possible to effect the cold stage treatment post aging if desired, (assuming that an ageing step is being used at all).

Turning to FIG. 1, wort from a lauter tun (not shown) passes through line 10 to fermentation vessel 12 where it is pitched with yeast and fermented in the usual manner. Following completion of the fermentation, the spent yeast is removed by centrifuge 13. Man's usual normal methods of removing the yeast cells may leave a minor amount of yeast cells in the green beer. However, these residual cells have been found to have adverse effects on the finished beer, it is thought due to their being lysed in the ice treatment according to the present invention and the resulting cell fragments have adverse effects on the organoleptic properties of the finished beer. Consequently, it is much preferred that extra care be exercised and if necessary, more efficient separating equipment utilized to remove substantially all of the yeast prior to the green beer being treated according to the present invention.

The brewed green beer is then rapidly cooled in a scraped surface heat exchanger 14 where cooling to the freezing point of the beer is effected, this will generally be in the range of −1° C. to −5° C., normally −2° C. to −4° C. depending on many factors including the specific alcohol content. In this case, it was −3.7° C. The cooling is effected in a short period, generally less than 60 and usually a few seconds. A minor amount of small crystals are formed, less than 5%, generally 2% or less by volume as was the case in this instance, the treatment being adapted to prevent the growth of large crystals or an excessive amount of small crystals (considered to be less than about 9–10 microns). In fact, less than about 2% of the volume of the beer is converted to ice in the cooling stage. The so cooled beer is then passed immediately to the ice-containing treatment zone 15. This zone is completely filled with a slurry comprising [of] ice crystals and the green beer, which slurry is maintained in a constant state of agitation to render it homogenous. The ice crystals are preferably significantly larger in size, by a factor of from 10 [and] *to* 100 times, than the crystals contained in the beer being treated. The treatment zone has a combination of insulation around the zone and a feedback mechanism in [according] *accordance* with which, in response to signals from ice sensors in the treatment zone, a reduction or increase in the amount of ice is corrected by ensuring the green beer is further cooled or is less cooled, respectively. Thus the objective of maintaining a fixed amount usually about 10% to 20% or 22% of the volume of the zone as larger crystals is maintained as is the temperature of the treatment. The ability to consistently maintain the low processing temperatures without the ice clogging and damaging the system is a critical aspect of the present invention. The ice treatment zone may, simply initially be loaded with the body of ice crystals but more conveniently, these are produced in situ upon startup of the system by running the heat exchange unit in such a manner as to produce major amounts of small crystals which are allowed to grow to the desired size in the treatment zone. Loading the zone in this manner may take from about one to several hours, usually about 2, depending on many factors including the type/capacity of heat exchanger used and the alcohol content of the green beer. This start-up phase is not considered to be part of the continuous operational phase of the chill-treating process described herein.

The residence time of the green beer in the ice treatment zone is relatively short, less than one hour, generally up to 15 minutes, especially 5 to 15 minutes only, and may be even less, following which, the treated beer is transferred to aging tank 16. It is then finished in the usual manner.

This system is elegantly practical in that:

(a) it is not complex; there are no counter-current flows and, in fact, only one and uni-directional flow, namely the fluid substrate being treated and hence requires minimal equipment and is simple to operate;

(b) the treatment does not involve concentration of the green beer and hence there is no constant removal of ice crystals (these requiring only their being discarded at the end of a brewing cycle). Obviously, the ice is not subsequently treated in any manner, there being so little of it relative to the amount of beer treated, that there is virtually no entrained beer, etc., associated with it.

(c) it is a process stage which gently processes the green beer at a high rate and is readily and conveniently incorporated into present brewing processes with little disruption to existing plant layouts;

(d) it is a continuous and rapid process thereby incurring small additional cost but delivering beneficial results as far as desirable product characteristics are concerned, especially a significant increase in chill stability as well as very positive organoleptic properties;

(e) using the equipment described, both the heat exchanger and the separation vessel are full with liquid medium and hence do not require maintenance of an inert or carbon dioxide atmosphere, except on start-up and up to the time the vessel [are] *is* filled.

Figure 2:
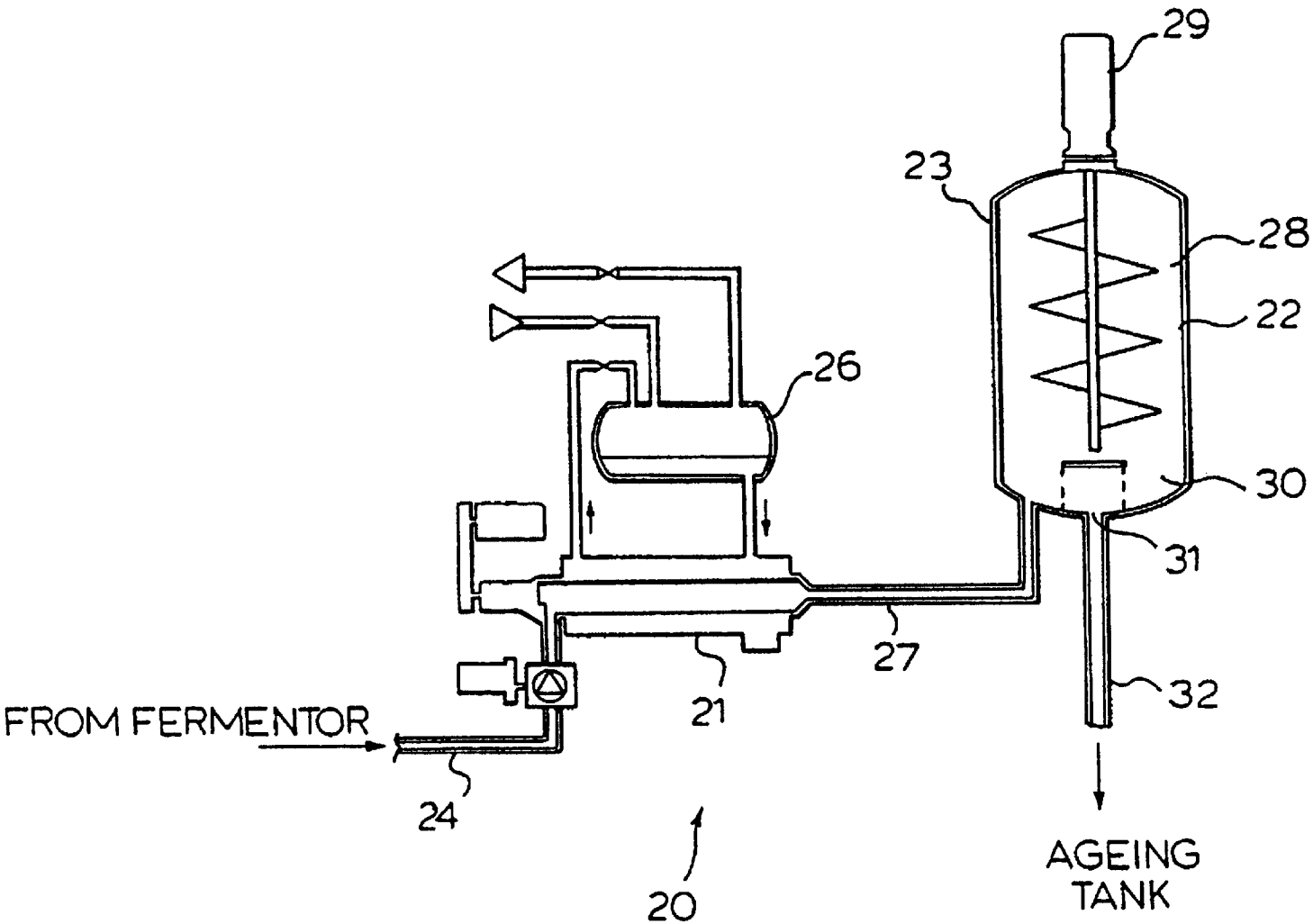
FIG. 2 is a diagrammatic cross-sectional view of a simple pilot plant system for effecting the cold processing stage, i.e. the cooling and ice-treating the beer according to the present invention.

Turning to FIG. 2, this shows a pilot plant for a beer cooling and ice treatment stage or system, generally designated 20, consisting of a scraped surface heat exchanger 21 and a treatment or separator vessel 22 having a capacity of 120 liters, which defines the ice containing treatment zone 23.

Pipe 24 connects the fermentor green beer storage tank (both not shown) to scraped surface heat exchanger 21, circulating pump 30 being arranged in the pipe 24 to provide for transfer of the beer. Heat exchanger 21 is provided with cooling system 26. Pipe 27 connects the heat exchanger 21 directly to vessel 22 and it constitutes the inlet for the cooled green beer. Vessel 22 is provided with a stirrer agitator 28 which is adapted to be driven by motor 29 and a separator or filter member 30 which surrounds the outlet 31 leading to pipe 32, which leads to the aging tank ([now] *not* shown). Separator 30 is extremely important in that [is] *it* must ensure that the larger crystals forming the stable volume of ice are prevented from leaving the treatment zone while, at the same time, [must allow] *allowing* passage of a small number of smaller crystals which may not melt during processing as do the majority, but do so thereafter. Further, it must be designed and/or otherwise adapted, for example, *by* being provided with scrapers, to prevent [it] *its* being clogged by the smaller particles.

Beer Example

A process in accordance with the present invention was carried out in the production of a rapidly chilled lager beer. The haze characteristics of this, and a conventional lager beer are set out in the following table. Note that the rapidly [chill] *chilled* lager beer was aged for seven days, and the conventional lager was aged for fourteen days. Also note, that the rapidly chilled lager had a significantly higher alcohol and extract content that did the conventional lager—both of these things would normally predispose the rapid chilled beer towards a manifestly greater amount of haze instability, which was not found to occur.

| | Conventional Lager | | | Rapidly Chilled Lager | | |
|---|---|---|---|---|---|---|
| Beer | C.O.E.* | IWkF.** | IIMoF*** | C.O.E.* | IWkF.** | IIMoF*** |
| | 10.96 | 54 | 62 | — | — | — |
| | 11.01 | 68 | 77 | 12.11 | 94 | — |
| | 10.91 | 73 | 71 | 11.95 | 65 | — |
| | 10.87 | 71 | 64 | 11.80 | 90 | — |
| | 11.03 | 70 | 70 | 11.92 | 66 | — |
| | 11.11 | 64 | 68 | 12.00 | 73 | — |
| | 10.88 | 56 | 81 | 11.67 | 59 | — |
| | 10.85 | 70 | 82 | 11.76 | 77 | 85 |
| | 10.99 | 74 | 86 | 11.91 | 77 | 89 |
| | 11.16 | 80 | 108 | 11.86 | 72 | 86 |
| | 11.22 | 97 | 123 | 11.80 | 70 | 77 |
| Totals | 120.99 | 777 | 892 | 118.78 | 743 | 337 |
| Averages | 10.99 | 70.64 | 81.1 | 11.878 | 74.3 | 84.25 |

*Calculated Original Extract
**One-Week Forcing Test
**Two Month Chill Haze

The units of measure are "haze units" and the beers were tested in accordance with the following procedure:

One-Week Forcing Test

This analysis is formed in order to predict the total suspended chill haze stability of the product. The test is based on the accepted belief that beer that is stored at an elevated temperature for a relatively short time, will develope a total suspended chill haze that is very similar to that formed in the same beer after prolonged storage at normal room temperature. Beer in a bottle or can, is placed in an upright position in a hot water bath at 49 degrees C., and held for a full week (seven days). Once this incubation is complete, the beer is allowed to cool to room temperature, then passed to a cold water bath at zero degrees C., and held for 24 hours. The bottles are removed from the cold water bath, and inverted to suspend all of the sediment. The haze is then measured nephelometrically with a Radiometer Hazemeter that has been calibrated against empirical turbidity standards. The beer is poured into the instrument chamber, and the diaphragm dial is read. This is converted to FTU's (formazin turbidity units) by multiplying by standardized calibration factors, in known manner.

Two Month Chill Haze

This test is performed by storing the packaged beer for two months at room temperature. The total suspended solids are then measured from samples, in the same way that was described under the One-Week Forcing test.

The results show that the process according to the present invention permits a 50% reduction in aging time, without increasing haze instability. Moreover notwithstanding expectations predicated on the greater alcohol and extract content of the rapidly chilled lager, the measured haze for the [rapid] *rapidly* chilled lager was the same as the haze that developed in the conventional lager. This is considered to be very significant, particularly since beer is now [typical] *typically* brewed in very large volumes, and can sit for a protracted period before ultimately being consumed.

Figure 3:
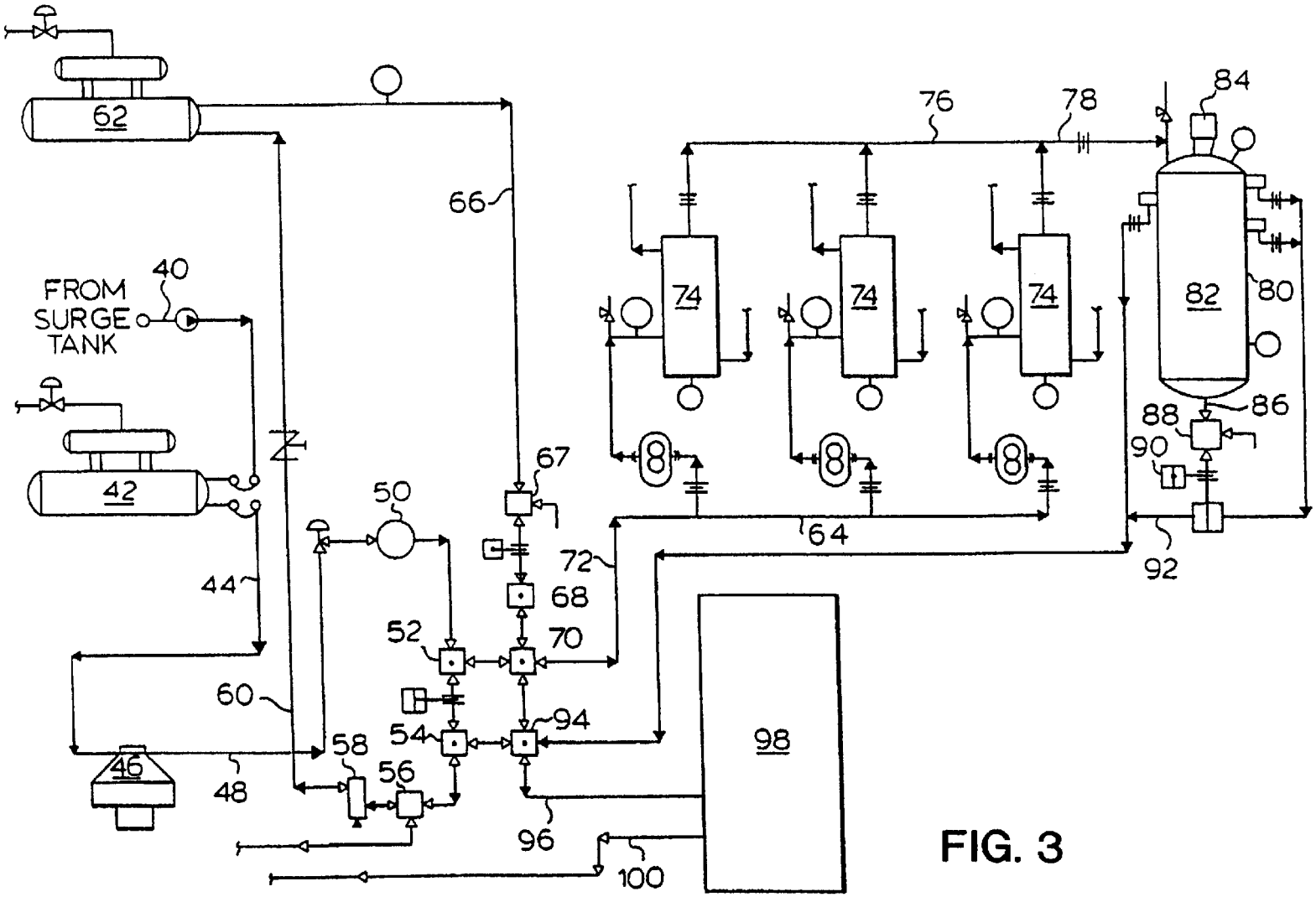
FIG. 3 is a flow diagram of a plant adapted to treat green beer according to the present invention; and, FIG. 4 is a graphical representation of freezing points for a variety of aqueous liquid foods, as a function of solids content.

Turning to FIG. 3, this is a flow sheet of a commercial scale facility which may be used to process beer, and again green beer is used as the example, according to the present invention. The facility has a green beer inlet pipe 40 connecting a fermentor or green beer surge/storage tank (not shown) to a beer cooler 42 which in turn is connected via pipe 44 to a Westfalia beer centrifuge 46. This centrifuge is maintained at optimum efficiency to ensure that for all practical purposes, virtually all yeast cells from the fermentation stage are eliminated from the green beer. The centrifuge 46 is connected through pipe 48, flow meter 50, valves 52, 54, 56 and 58 and pipe 60 to beer cooler 62, the latter being connected to heat exchange manifold 64 by pipes 66, valves 67, 68 and 70 and pipe 72. Alternatively, centrifuge 46 can be connected directly to manifold 64 by pipe 48, through valves 52 and 70 and pipe 72. The manifold 64 serves scraped surface heat exchangers 74. Three heat exchangers are shown arranged in parallel but, obviously, the number or type of the heat exchangers may vary depending on requirements. A second manifold 76 is arranged to combine all material exiting the heat exchangers 74 and deliver same via pipe 78 to treatment or separator vessel 80 which encloses treatment zone 82 having a volume of 90 hectoliters. Vessel 80 is fully insulated and is provided with an agitator mechanism (not shown) driven by motor 84, and an exit pipe 86 which, via valves 88 and 90, connects to pipe 92 which, via valve 94 and pipe 96 connects 82 to aging tank 98. Tank 98 is provided with beer outlet pipe 100. Vessel 80 is also provided with ice monitors or sensors (not shown) which identify changes from the desired "steady state" operating condition (for example by measuring changes in electrical conductivity of the slurry) as to ice crystal content and automatically instruct the heat exchangers to provide more, or less, cooling to return the treatment zone to its operating steady state condition. In the illustrated embodiment, these monitors are conductivity probes (sensors 81) are (Yokogawa, type s250113E, NW 25, 4–20mA), which measure variations in the conductivity of the beer slurry that are proportional to the ice concentration in the reactor. Feedback from the probes is passed to an ammonia (the refrigerant) backpressure control valve system. Control of the refrigerant backpressure provides control over the refrigerant temperature and thereby also affords control over the amount of ice that is retained in the recrystallizer. In accordance with preferred practice for the illustrated apparatus, the probe-effected operation of the ammonia back-pressure control valve adjusts the refrigerant temperature set point at pre-determined intervals during operation. Typically, the system response is limited to allow the temperature set point to be changed by no more than 0.5 degrees C. every half hour, to a maximum change of plus or minus two degrees C.

If it deviates from the set conditions vessel 80 is also provided with a separator device (not shown in FIG. 3) which prevents all but a small number [if] *of* any residual small ice crystals from exiting the vessel thereby maintaining the "fluidized bed" feature as the ice slurry is agitated.

This equipment was obtained from Niro Process Technology B. V., De Beverspijken 7,5221 EE's-Hertogenbosch, The Netherlands. The recrystalizer that was used is part of a Niro type NFC—60 slush freezing unit, adapted to operate at a rated flow of about 350 hL/hr, with an inlet alcohol concentration of 7.5% v/v, an inlet temperature of −1 degrees C., and an outlet temperature of −3.5 degrees C., using a 20% (18hL) resident volume of supercritical ice crystals.

In operation, green beer alcohol content 7% by volume is obtained from a regular fermentation at a temperature of about −15° C. and is introduced into the system through pipe 40, passed through beer cooler 42 leaving at a temperature of −8° C. to −10° C. It is then passed through a dropping cooler 55 which further reduces its temperature even further to −1.5° C. thereby reducing the load on the scraped heat exchanger 74 through which the beer is subsequently passed. The temperature of the green beer exiting heat exchangers 74 is about −4° C. and it comprises about 2% by volume of small crystals having an average size of between 0.1 and 10 microns. The residence time of green beer in the heat exchangers is only about one second and *the beer* is then introduced immediately through manifold 76 into ice treatment zone 80. Initially, this zone does not contain the required loading of ice slurry and hence this was generated over a two hour start-up period when about 1,800 kilograms of larger ice crystals having an average size of 200 to 3,000 microns were created. Vigorous agitation maintains the slurry in a homogenous mass which is retained in the vessel by the separator while cooled green beer was treated continuously at the rate of 450 hectoliters per hour, this equating to an average beer residence time of about 12 minutes. The temperature in the treatment zone is maintained at about −4° C. The amount of ice crystals in the zone, or "fluidized bed" remained substantially constant. The bed may be maintained for extended periods but, from a practical viewpoint, it is removed and discarded at end of a brewing cycle which is generally following its being used in the treatment of from 1,200 to 15,000 hectoliters of green beer.

The amount of water exiting the system as ice is in fact not directly measurable, although indirect inferences suggest that only 0.1% to at most 1.5% and consequently the concentration of the beer remains essentially constant, especially when the system is flushed with brewing water at the end of the cycle.

In summary, the process of the present invention provides a simple to operate continuous process, a balanced beer which is less harsh, more mellow and has greatly increased shelf life due to increased physical stability compared with regular beers, this latter quality itself providing significant economic benefit in greatly reducing the time required for regular aging and possibly the capital cost involved in providing the generally required ageing tanks.

The following examples are intended to illustrate the contemplated application of the present process to the manufacture of distilled beverages.

Distilled Alcoholic Beverages Example

Yeast action is limited by the amount of alcohol present, and at about the level of 18% by volume, yeasts cease to ferment. For this reason, simple fermentation cannot yield alcohol concentrations exceeding about 18%. For higher levels, distillation is required. Note that alcohol has a boiling point of about 78.5 degrees C., the alcohol-water azeotrope has a boiling point of 78.3 degrees C., and water has a boiling point of 100 degrees C. This means that lower boiling point fractionation can enrich the alcohol content to about as much as 96% alcohol, although in typical beverage distillation 40 to 50% alcohol is the norm. Although freeze concentration of these products has been offered as an alternative to conventional distillation processes, economics do not generally favor changing over from the more traditional stills. Moreover, there is evidence that the freeze concentration process can yield a non-traditional flavor profile, which could [effect] *affect* market acceptance. Accordingly, the use of conventional boiling stills continues to be the method of choice for the manufacture of distilled beverages.

Distilled alcoholic beverages may be divided into three major classes. The first such class includes those starting from a starchy substrate and needing enzymes, usually in the form of barley malt, to convert the starch to fermentable sugars (e.g., scotch from all malt; rye from mixtures of rye and malt; bourbon from mixtures of corn, rye and malt; Irish whisky from rye, wheat and malt; and arrak, from rice).

Typically, about 15% of high diastase malt is added to the other starch sources, water is added, and the combined mash is converted at about 56 degrees C. under agitation. The mash is then heated briefly to 62 degrees C. after which it is cooled to about 17 to 23 degrees C. and acidified with lactic or sulphuric acid, to a pH of 4.7 to 5. As an alternative, the pH may be lowered by microbiological action (e.g., through the addition of Lactobacillus [delbruckii] *delbrückii*). The lower pH controls the contamination and favors yeast metabolic activity. Fermentation typically takes about 3 days, and temperature is controlled at about or below 32 degrees C. In some distilleries, this is carried out as part of a continuous fermentation process.

At the end of the fermentation the alcohol and aroma substances are distilled off. Different whiskies are distilled to different final proofs and then are diluted to the selected final product concentration. The type of distillation equipment and the final proof to which a whisky is distilled determine very much the character of the final product. Bourbon, for instance, is usually distilled to give a 170 proof distillate, whereas with rye in a simple pot still a final 130 to 140 proof distillate is produced.

For Scotch whiskies, the typical smoky flavour is produced at least partially from malt which has been kilned at a high temperature over a peat fire. Scotch is aged usually in sherry or partially carbonized wooden casks. Most [american] *American* whiskies are stored in oak casks. Several of the typical flavor [substance] *substances,* such as guaiacol, are leached out from the wood. The Scotch highland whiskies are produced in simple pot stills, while lowland whiskies are produced in patent stills and the malts are less heavily smoked.

The second broad classification includes those products that are started directly from a sugar substrate, and in which at least some portion of the native aromatics are distilled to become part of the distillate, (e.g. cognac armagnac or brandy from grapes; kirschwasser from cherrys; slivovitz and [slow] *sloe* gin from plums; tequila from agaves; rum from sugar cane; applejack or calvados from apples; toddy from coconut milk; and framboise from raspberrys). The third group includes those which are produced by adding flavor substances to quite pure ethanol which has been obtained by distillation and rectification, (including both liquors and liqueurs and cordials: aquavit, pernod or kummel from caraway; or gin from juniper berries; and [creme] *crème* de menthe from mint and sugar; [creme de cocoa]

*crème de cacao* from cocoa beans, sugar and vanilla; cherry brandy from cherrys and sugar; coffee liquor from coffee and sugar; grand marnier, from orangepeel and, sugar, drambuie from honey and whisky; or, chartreuse or benedictine from herbs and sugar).

Cider Example

In the production of cider, juice (either pressed from crushed apples or prepared from concentrate[,]) is treated with an amount of sulphate necessary to kill any indigenous microflora. Then the juice is pitched with a selected fermentation yeast, and fermented to completion, The cider is then racked off the yeast lees. In accordance with the practice contemplated pursuant to an application of the present invention, the cider is the subjected to the present chill treatment. Blending, addition of antioxidants and sweeteners, carbonation, sterilization or aseptic packaging occurs in due course, to produce the final fermented cider product.

Regardless of which class of product is being considered for treatment, the process according to the present invention may be applied to distilled beverages following the complete conversion of the fermentable substrate to ethanol. Typically, the distillation process will also have been completed. In the "third" above mentioned group, it may be preferable to carry out the process of the present invention prior to the introduction of the additional flavors). In any case, the aqueous ethanol-containing solution is subjected to a cold stage comprising rapidly cooling the solution to a temperature at about its freezing point (which depending primarily on the alcohol content varies greatly to form only minimal amounts of nascent ice crystals therein. The resulting cooled aqueous ethanol-containing solution is then mixed for a short period of time with a post-cold-stage resident volume of stable ice-crystals in an aqueous ethanol-containing slurry, without any appreciable increase in ice crystal mass contained in the resulting mixture during that mixing. Thereafter, the so treated solution is extracted from the mixture, without any substantial collateral increase in total dissolved solids concentration.

Figure 4:
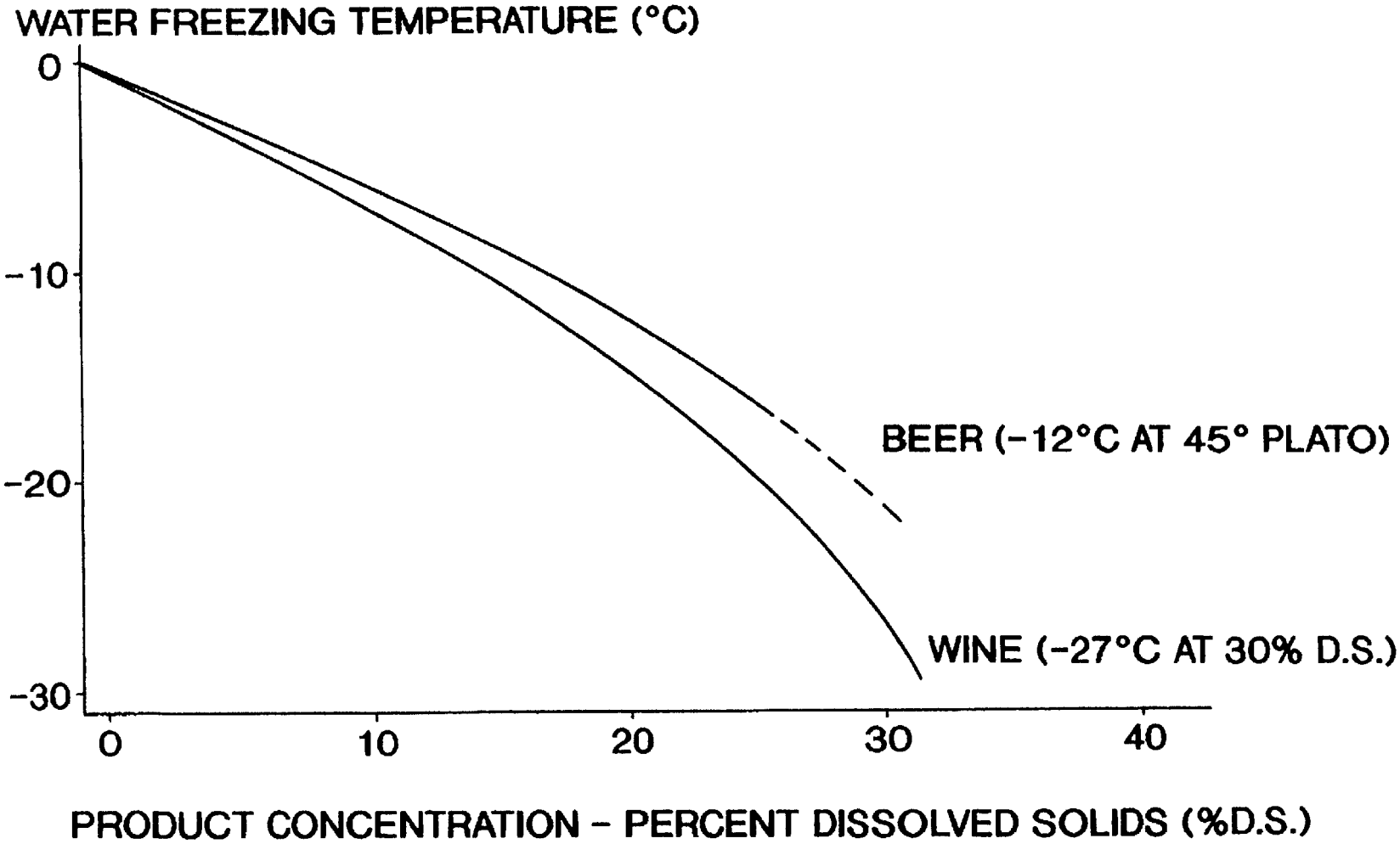

FIG. 4 is illustrative of various freezing point temperatures for a variety of products, as a function of dissolved solids concentrations. Note that the present invention relates generally to fermented liquid beverages and especially fermented alcoholic [beverage] *beverages*—for example, cider, various liquors derived whether in whole or in part through a fermentation step, and including too fermented cereal beverages, e.g. fermented malt beverages such as malt whiskey for example, but in particular, including fermented malt brewery beverages, such as beer (e.g), lager, ale, porter, malt liquor, stout, or the like in keeping with the most general usage of that term—and including for greater certainty, but without limitation, "low-alcohol" and "non-alcoholic" (including cold-contact fermented beer).

Also, as will be appreciated, it is preferred that the chilling process is carried out in two distinct zones and, indeed, those zones are [preferable] *preferably* contained in separate and discrete vessels. However, this is not essential in that the zones may be contained within one vessel provided that the beverage is first chilled and the nascent ice crystals formed therein and that the chilled beverage is then mixed with the stable ice crystal containing slurry.

I/We claim:

1. A process for chill-treating [an aqueous fermented liquid cereal] *a non-distilled malted barley* beverage, comprising:

subjecting the beverage to a cold stage comprising rapidly cooling the beverage to a temperature at about its freezing point to form only nascent ice crystals in minimal amounts thereof;

mixing the resulting cooled beverage for a short period of time in a post-cold-stage resident volume of stable ice-crystals dispersed as a slurry, without any appreciable increase in total ice crystal volume of the resulting mixture; and, extracting the so treated beverage from said mixture, and whereby said process is carried out without any substantial collateral decrease in the total amount of water that is contained in the beverage.

2. A process for chill-treating a [fermented alcoholic liquid cereal] *non-distilled malted barley* beverage comprising:

subjecting a volume of the beverage to a cold stage comprising rapidly cooling the beverage to a temperature at about its freezing point to form nascent ice crystals in minimal amounts thereof;

mixing the resulting cooled beverage for a short period of time in a post-cold-stage resident volume of stable ice-crystals dispersed as a slurry, without any appreciable increase in total ice crystal volume of the resulting mixture; and, drawing-off treated beverage in a volume equivalent to said volume of the beverage, from said mixture, whereby said process is carried out without any substantial collateral concentration of the beverage.

3. A process for continuously chill-treating a [cereal] *non-distilled malted barley* beverage comprising:

subjecting a volumetric flow of pre-treatment beverage to a cold stage comprising rapidly cooling said beverage to a temperature at about its freezing point to form nascent ice crystals in minimal amounts thereof;

mixing the resulting cooled beverage for a short period of time with a post-cold-stage resident volume of stable-ice-crystal-in-aqueous-liquid slurry of the same beverage, without any appreciable increase in total ice crystal mass contained in the resulting mixture during said mixing; and, drawing-off treated beverage, having a dissolved solids concentration generally equal to that of said pre-treatment beverage, in a volumetric flow equivalent to said volumetric flow of pre-treatment beverage, from said mixture, whereby said process is carried out without any substantial collateral concentration of said beverage.

4. The process for continuously chill-treating according to claim 3 and wherein the processing steps comprise:

subjecting a volumetric flow of pre-treatment beverage to a cold stage comprising rapidly cooling said beverage to a temperature at about its freezing point to form nascent ice crystals in minimal amounts thereof;

mixing the resulting cooled beverage for a short period of time with a post-cold-stage resident volume of stable-ice-crystal-in-aqueous-liquid slurry of the same beverage containing stable ice crystals of about 10 to about 100 times larger than said nascent ice crystals, without any appreciable increase in total ice crystal mass contained in the resulting mixture during such mixing and, drawing-off treated beverage, having a water content of not substantially less than that of said pre-treatment liquid, in a volumetric flow equivalent to said volumetric flow of pre-treatment beverage, from said mixture, whereby said process is carried out without any substantial collateral concentration of said beverage.

5. The process according to claim 4, wherein said beverage is an aqueous mixture containing ethanol.

6. A process for chill-treating a near-freezing non-distilled malted barley beverage [cereal beverage], in which said near-freezing beverage is passed in slurried-relation through a mass of supercritical ice crystals under thermodynamically controlled conditions selected such that any melting of subcritical crystals contained in said near-freezing beverage is generally thermodynamically less than or equal to collateral formation of said supercritical crystals to thereby avoid any substantial increase in concentration of the beverage over the course of its slurried-relationship with said supercritical crystals, and then retrieving said beverage.

* * * * *